United States Patent
Antonelli et al.

(10) Patent No.: US 6,957,579 B1
(45) Date of Patent: Oct. 25, 2005

(54) CAVITY WALL MEASUREMENT APPARATUS AND METHOD

(75) Inventors: Lynn T. Antonelli, Cranston, RI (US); Kenneth M. Walsh, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 507 days.

(21) Appl. No.: 10/326,961

(22) Filed: Dec. 23, 2002

(51) Int. Cl.[7] ............................................. G01P 13/00
(52) U.S. Cl. ................................................ 73/170.02
(58) Field of Search .................... 73/170.02; 180/167, 180/169; 356/5.01

(56) References Cited

U.S. PATENT DOCUMENTS

| | | | | |
|---|---|---|---|---|
| 5,504,569 A | * | 4/1996 | Kato et al. | 356/3.11 |
| 5,581,232 A | * | 12/1996 | Tanaka et al. | 340/435 |
| 5,600,561 A | * | 2/1997 | Okamura | 701/300 |
| 5,604,580 A | * | 2/1997 | Uehara | 356/28 |
| 5,808,728 A | * | 9/1998 | Uehara | 356/5.01 |
| 6,072,421 A | * | 6/2000 | Fukae et al. | 342/42 |
| 2003/0127588 A1 | * | 7/2003 | Martinez | 250/231.13 |

* cited by examiner

*Primary Examiner*—Edward Lefkowitz
*Assistant Examiner*—Andre Allen
(74) *Attorney, Agent, or Firm*—James M. Kasischke; Michael P. Stanley; Jean-Paul A. Nasser

(57) ABSTRACT

A method of measuring the vapor-liquid boundary surrounding a supercavitational high speed underwater vehicle includes the steps of arranging a sensor on a surface of the vehicle. The sensor has a transmit source for emitting an optical signal and a plurality of optical detectors for receiving a reflected optical signal. The reflected optical signal is detected with one of the optical detectors, and a duration of time between the emitting of the optical signal and the receiving of the reflected optical signal is measured. The method determines a separation distance from the transmit source to the receiving optical detector. The duration of time and the separation distance are combined to compute a boundary distance.

17 Claims, 6 Drawing Sheets

CAVITY WALL MEASUREMENT APPARATUS AND METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a method for measuring the distance between the vehicle hull and the vapor-liquid cavity formed about an underwater supercavitational vehicle. More specifically, the present invention relates to a method of mounting optical emitters and optical receivers to an underwater vehicle to determine the distance to a vapor-liquid cavity.

(2) Description of the Prior Art

Underwater supercavitational vehicles travel at high speed in the water creating a gaseous cavity around their hulls. The cavity helps support the vehicle's high speed by reducing vehicle drag. The gaseous cavity can either be "ventilated" wherein gas is introduced or self-cavitating wherein low pressure created by hydrodynamic flow induces cavitation of the surrounding fluid. Stable guidance of such a vehicle in the water is critically dependent upon maintenance of this cavity. As the vehicle travels in the water, the cavity shape continually changes, particularly when the vehicle turns. Knowledge of the location of the cavity boundary is useful for maintaining vehicle stability in the water.

Information on the cavity boundary location and contour are also useful for initial hydrodynamic studies in propulsion and cavity ventilation during test exercises and vehicle design.

One technique for measuring the distance between the laser sensor device such as the vehicle hull and a generic (optically reflective) target is through a geometrical triangulation method, as illustrated with reference to FIG. 1. With this technique, a laser beam 11 is transmitted from a transmitter 15 towards a flat target measurement surface 13 at a known angle α. The laser beam 11 is then diffusely reflected from the measurement surface 13 and is recorded by a detector 17 angled appropriately to capture the diffuse reflections from the target surface 13. Since the locations of the transmitter 15 and receiver 17 are fixed, the distance between the transmitter 15 and receiver 17, x, is known as is the launch angle, α, and receive angle, β. The altitude of the triangle, h, can then be calculated to obtain the desired distance information.

However, when the surface is not diffusely reflective, as is the case with the specularly reflecting vapor-liquid interface, the alignment of the sensor becomes difficult. Since the vapor-liquid interface of the underwater supercavitational vehicle will be in continual dynamic motion, the measurement surface is not continuously flat, but rather randomly fluctuates, skewing the reflectance angle. The geometrical based sensor also demands a certain standoff distance in excess of 2 cm, the minimum laser to target surface distance that can be measured. Thus, the triangulation method is not directly suitable for dependably measuring the laser to surface distance. Ranging has also been attempted using heterodyne methods in a backscatter-modulated laser diode setup. The frequency difference between the frequency modulated laser light transmitted and reflected from the target is used to calculate the corresponding laser to target distance variations, about a nominal distance. This nominal distance of the cavity wall location may not be available a priori making sensor initialization difficult. Also, such a phase change in the laser light may come from the temperature gradient within the cavity due to ventilation and rocket motor exhaust gases. The change in phase of the laser light by means other than the cavity wall displacement will effectively reduce the received signal-to-noise ratio and limit sensor capabilities. Thus, it is believed that phase dependent ranging methods are not appropriate for this environment. It is postulated that the proposed method for measuring the cavity wall will not depend upon the frequency modulation of the laser beam or in its phase as the laser beam propagates in the area between the laser and the target.

What is therefore needed is a method for measuring and an apparatus for so measuring the extent of the vapor-liquid cavity formed about an underwater supercavitational vehicle that is not adversely affected by the non-diffuse and variable surface angle reflectivity of the vapor-liquid boundary.

SUMMARY OF THE INVENTION

Accordingly, it is an object of the present invention to provide a method for measuring and an apparatus for measuring the extent of the vapor-liquid cavity formed about an underwater supercavitational vehicle.

In accordance with the present invention, a method of measuring the vapor-liquid boundary surrounding a supercavitational high speed underwater vehicle includes providing a sensor on a surface of a vehicle. The sensor includes a transmit source for emitting an optical signal and a plurality of optical detectors for receiving a reflected optical signal. The transmit source emits the optical signal, and at least one of the optical detectors detects the signal. A duration of time between the emitting of the optical signal and the detecting of the reflected optical signal is measured. The method then computes the separation distance from the transmit source to the optical detector which detected the reflected optical signal. The duration of time and the separation distance is combined to compute a boundary distance.

In accordance with the present invention an apparatus for measuring the distance to a reflective boundary from a vehicle comprises at least one sensor arranged on a surface of a vehicle, the sensor comprises a transmit source for emitting an optical signal, and a plurality of optical detectors for receiving a reflected optical signal formed from a reflection of the optical signal off of the reflective boundary, a timer joined to the sensor for measuring a duration of time between the emitting of the optical signal and the receiving of the reflected optical signal, a computer joined to the timer for computing a separation distance from the transmit source to at least one of the plurality of optical detectors having detected the reflected optical signal, and combining the duration of time and the separation distance to compute a boundary distance.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
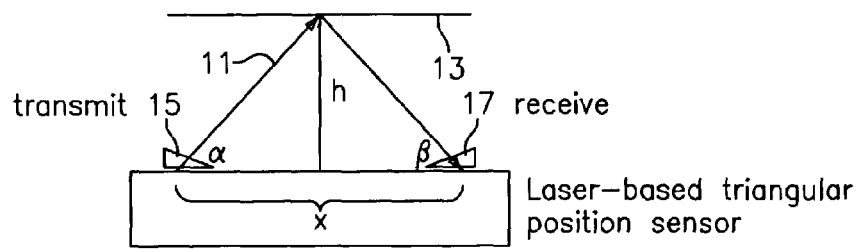
FIG. 1 provides a diagram of the geometrical triangulation method for determining the distance between the laser source and the measurement surface (target) known in the art.
Figure 2:
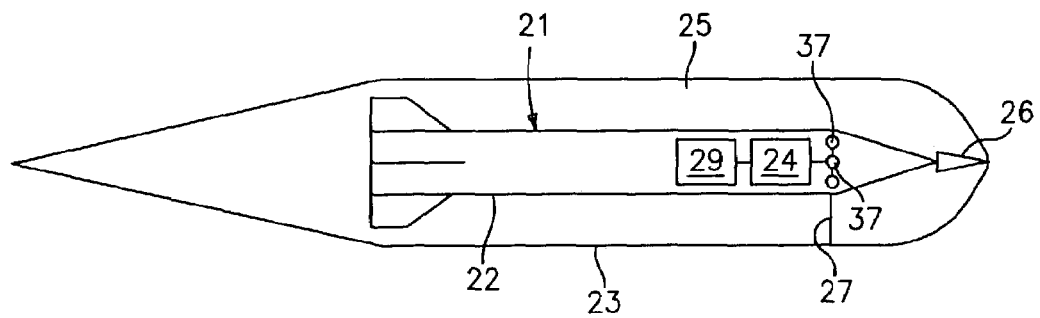
FIG. 2 is a diagram of a supercavitational vehicle depicting the vapor-liquid cavity, front end cavitator, cavity ventilation, and rocket propulsion of the present invention.

The present invention proposes a method for measuring the distance between the hull of a supercavitational high speed underwater vehicle and the vapor-liquid boundary surrounding the vehicle using information from the time delay of a laser pulse in combination with information from a geometrical triangulation method. With reference to FIG. 2, there is illustrated a side view drawing of a supercavitational vehicle 21 having a hull 22 during underwater high speed travel. A cavitator 26 is positioned at the front of hull 22. A ventilated air cavity 25 surrounds the vehicle 21 hull. The interrogation laser beam 27 bounces off the vapor-liquid boundary 23. The vehicle includes a computer 29 computing the distance between the hull of the vehicle and the surrounding vapor-liquid boundary. In addition, the vehicle includes a timer 24 for measuring the time delay of the laser pulse. An array of laser-based position sensors 37 is necessary for 360° coverage of the cavity boundary. However, the description of the operation of a single sensor 37, detailing the measurement concept is provided below. In general terms, this invention outlines a technique for measuring the distance from the laser source to a dynamic surface whose reflective properties fluctuate in time.

Figure 3A:
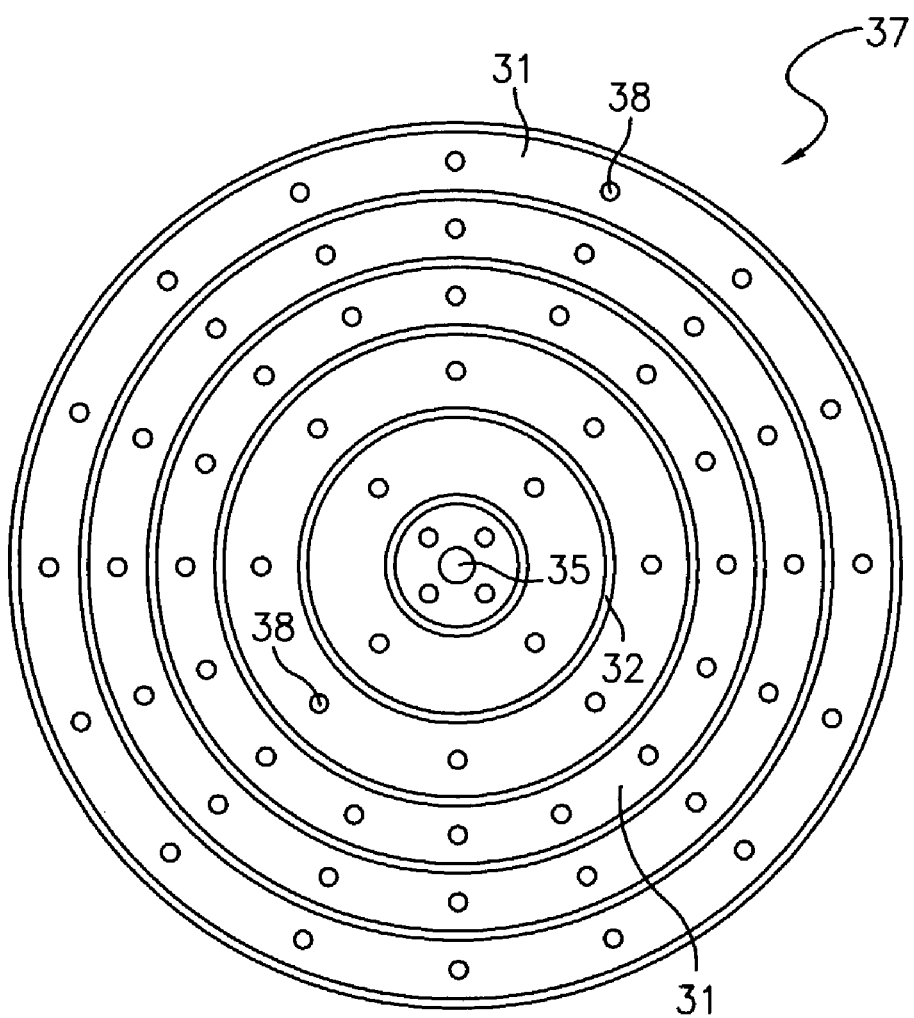
FIG. 3A is a top view of one embodiment of the laser transmit and receive array configuration of the present invention.

In FIG. 3A there is shown a top view of the sensor 37 of the current invention. Sensor 37 can be covered with a transparent material to protect sensor 37 and allow hydrodynamic flow over it. The transparent material is preferably a clear epoxy that disperses received radiation. Sensor 37 has a central signal source 35. Source 35 can be a laser, a coherent radiation source, a focused light beam or the like. Surrounding source 35 are a plurality of detector rings 31 for absorbing light energy. Detector rings 31 are separated by borders 32. Detector rings 31 have pinholes 38 formed therein with optical fibers 40 received therein.

Figure 3B:
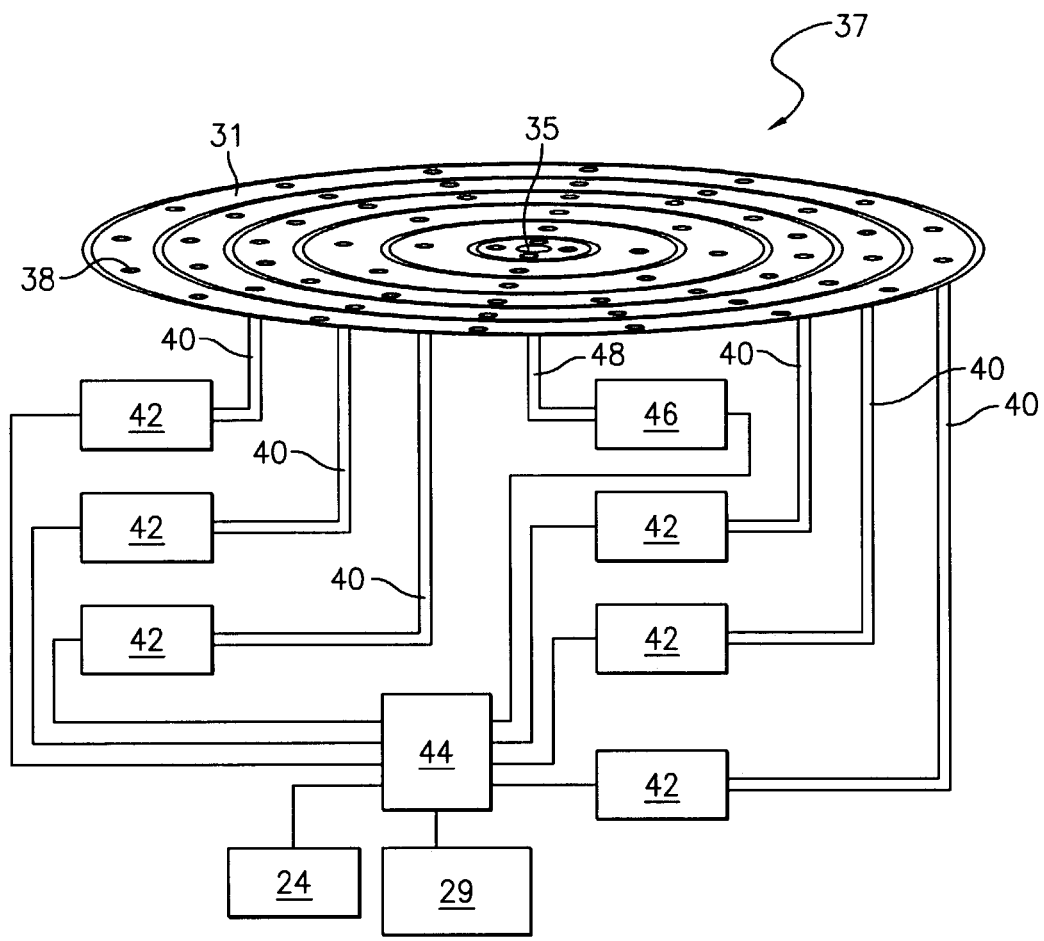
FIG. 3B is a diagram of the sensor array and circuitry.

FIG. 3B shows a side view of sensor 37 with the associated optical fibers 40, photo detectors 42, interface card 44 and timing device. Source 35 can be joined directly to an emitter 46 or it can be joined to emitter 46 by a fiber optic line 48, as shown. Optical fibers 40 transmit absorbed light to a photodetector 42. One photodetector 42 receives photons from all of the optical fibers 40 in one ring 31. The photo detectors 42 are joined to interface card 44 which is joined to computer 29 and timing circuit 24. In an alternate embodiment, photo detectors 42 could be provided directly in the rings 31 to receive absorbed light; however, capacitive delay and expense make this a less desirable alternative.

The position sensor 37 configuration using multiple concentric rings for optical detection 31 is preferred as the optically reflecting vapor-liquid boundary 23 is in constant motion causing a continual variation in the angle of the vapor-liquid boundary 23 relative to the incident laser beam 27 arrival. The angular variation of the vapor-liquid interface is estimated to generate reflections within 25° relative to the normal of the hull 22 where the laser beam 27 is transmitted. The majority of reflections will occur within a 15° radius based on experimental observations of reflected laser light on a slightly turbulent hydrodynamic vapor-liquid boundary conducted in a high speed water tunnel. The range of angular reflections provides an initial estimate to the total area of coverage of the receivers. Less coverage (15° for example) may be used with the effect of covering a smaller percentage of possible reflections, and will be applicable to cavity surface incurring less turbulence. Cavity surfaces with greater turbulence, such as towards the aft of the vehicle, will have a larger range of reflection angles. Such a surface will also be poorly defined within a 1 mm resolution.

Figure 4:
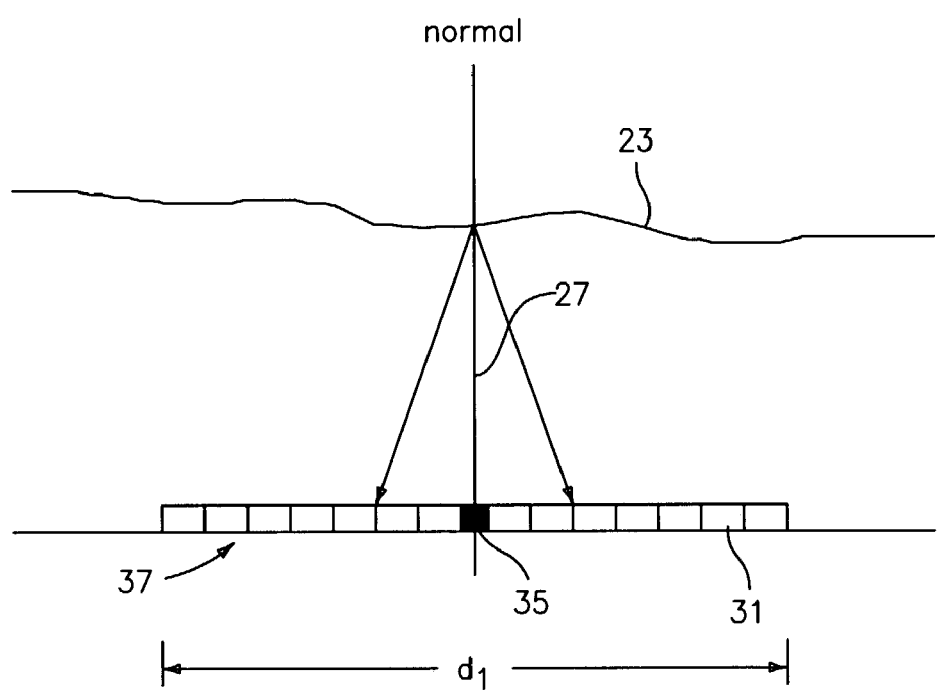
FIG. 4 is a side view of the geometrical configuration of the array dimensions for a single position sensor of the present invention.

With reference to FIG. 4, there is outlined the geometric properties of a laser beam 27 reflected at the 25° angle variation. The spatial extent of the detectors must optimally span a circular area, 92 mm in diameter (aperture diameter $d_1$), calculated using equation (1) for a maximum hull to cavity wall distance, (max distance) of 100 mm.

$$\text{aperture diameter} = 2*(\text{max distance})*\tan(25°) \tag{1}$$

FIG. 4 shows the side cross section of the position sensitive detector head of FIG. 3B. The number of detector rings 31 and their dimensions will determine the accuracy of the position estimate location along the length of the hull, based on the above specified triangular method due to the independent coverage of the estimated detection area. The detector rings 31 may be concentric rings of optically transparent material terminated fiber optic leads with appropriate aperture lenses for light capture, semiconductor light sensitive optical receivers, or a charge couple device structure (CCD).

Both time gating of a laser pulse from initial transmission and the reflection from the measurement surface and subsequent detection, along with geometrical triangulation calculations form the basis for the position sensors of the present invention. The time gating and the triangulation methods are outlined below along with the technique of using the combined information to determine the position of the vapor-liquid boundary 23 forming a cavity wall measurement surface.

Figure 5A:
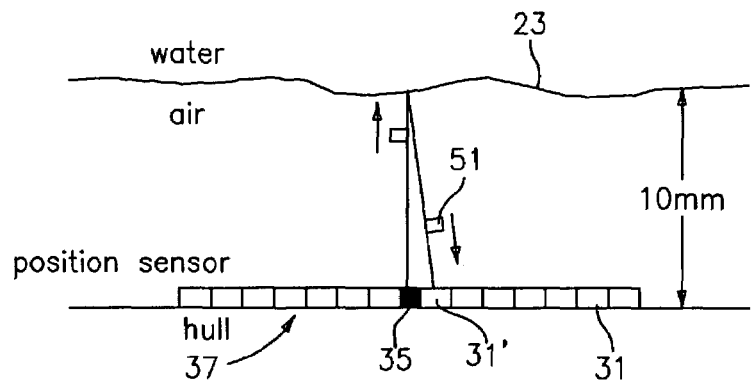
FIGS. 5A and 5B illustrate the geometrical configuration of the laser interrogation beam of the present invention relative to the hull and the vapor-liquid boundary.
Figure 5B:
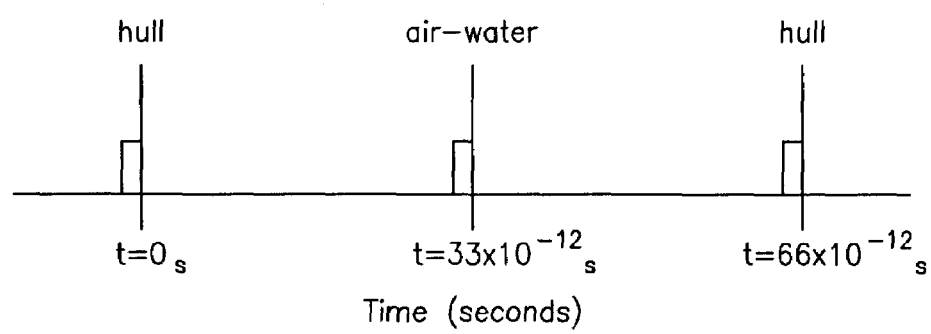

With reference to FIGS. 5A and 5B, there is illustrated the geometrical configuration of a laser interrogation pulse 51 relative to the position sensor 37 and the vapor-liquid boundary 23 pertaining to the minimum laser time of flight. A short duration laser pulse 51 is directed from the center of the position sensor 35 towards the vapor-liquid boundary 23. Approximately 2% of the pulse energy is specularly reflected from the vapor-liquid interface based on Fresnel reflection. The portion of the laser pulse energy reflected from the boundary is detected by an optical detector 42 (FIG. 3B). The time duration between transmission and initial reception of the leading edge of the pulse is used to make a preliminary range estimate, according to equation (2). Speed refers to the speed of light in the cavity (~$3\times10^8$ m/s), distance refers to the total distance traveled by the laser pulse and time refers to the total time of flight of the laser pulse 51 between transmission and detection of the leading edge of the pulse. It is estimated that the position sensor 37 will be capable of measuring the hull to cavity wall displacements from 10 mm to 100 mm with a resolution of 1 mm. The minimum measurable displacement, defining the minimum time of flight of the laser beam, dictates the maximum laser pulse duration such that the pulse is terminated before the leading edge arrives at the vapor-liquid boundary. The shortest path for laser propagation occurs when the laser beam is incident perpendicularly on the cavity boundary and is reflected back to the central laser transmitter 35.

$$\text{distance} = \text{speed} * \text{time} \tag{2}$$

For minimum hull to cavity wall distance of 10 mm, and perpendicular reflection (shortest time of flight):
distance=2*(10 mm)=0.02 m (round trip)
speed=$3\times10^8$ m/s
The total time of flight of the laser beam is calculated as: $66\times10^{-12}$ s. The one-way time of flight of the laser pulse is then $33\times10^{-12}$ s.

Thus, a pulse duration on the order of $1\times10^{-12}$ to $10\times10^{-12}$ seconds (one to ten picoseconds) will be adequate to measure distances as small as 1 mm. The distance spanned by a pulse lasting 1 picosecond is 0.3 mm.

Since the cavity boundary is in constant motion, it is likely that a ring 31' adjacent to the transmitting source 37 will be illuminated for the example near perpendicular reflection, since the center transmitter is not an optical receiver. The resolution or accuracy of the initial position measurement based on the time gating will depend upon the ability of the detectors 42 to detect the leading edge of the pulse 51 or the initial laser reflections due to the interrogation pulse 51. This may be accomplished by having an interrogation pulse 51 with a characteristic waveform signature such that a correlation with the transmit pulse waveform can be made to aid in identification, and to discriminate between adjacent sensors 37 along the vehicle hull. Also, since the exact angle of laser reflection is not known, the time of flight method alone does not provide enough information on the actual distance between the hull and the cavity wall.

Figure 6:
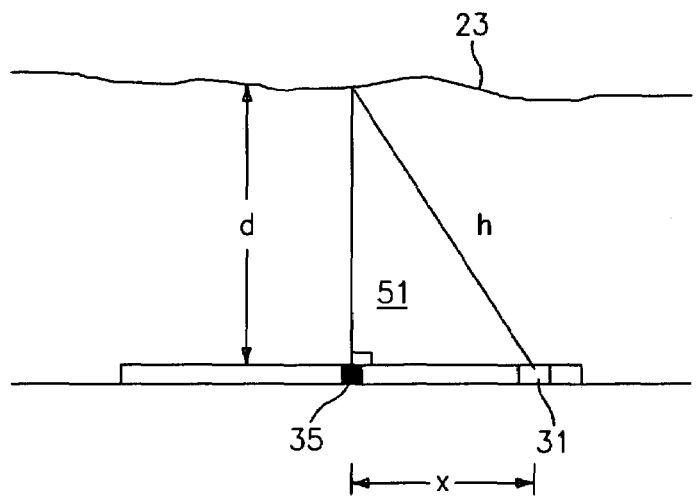
FIG. 6 is an illustration of the geometrical definition of the triangulation distance detection method of the present invention.

Referring now to FIG. 6, the triangulation method uses geometrical information to determine the distance between the hull 22 and the vapor-liquid boundary 23 as described below. The laser beam 51 is pulsed from the vehicle in a direction perpendicular to the position sensor 37 and hull 22. The position, x, of the ring 31 that first receives a return pulse from light reflected from the vapor-liquid boundary 23 is recorded. However, there is not enough information using just the triangulation method to make a distance estimate.

Figure 7A:
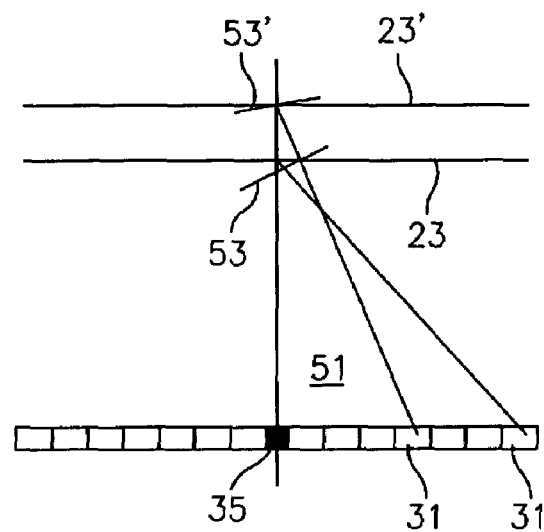
FIGS. 7A and 7B provide diagrams outlining ambiguity in the position estimate from the (a) time of flight method; and (b) triangulation method due to variation in the reflection angle of the present invention.
Figure 7B:
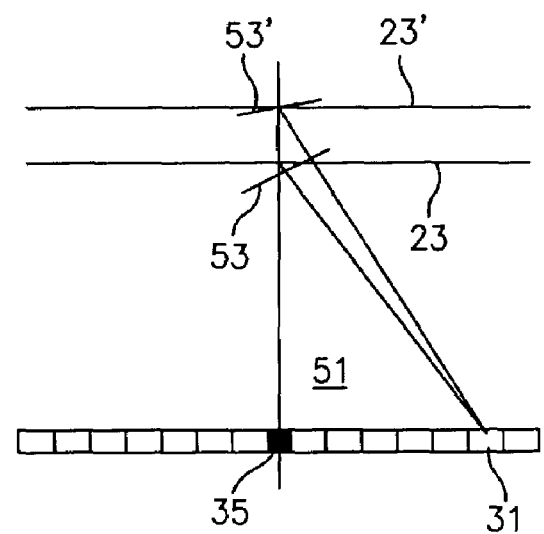

There is ambiguity in the measured position in both the time of flight and the triangulation estimates if taken independently, as illustrated in FIGS. 7A and 7B. In FIG. 7A, the time of flight of the laser beam for each of the two paths is the same, creating an ambiguous solution to the actual position. Likewise, in FIG. 7B, an ambiguous position estimate is obtained when multiple laser beam paths are taken and recorded by a detector 31 identically displaced from the central laser transmitter 35 location. This is due to the variability in reflection angle (slope) 53 of the vapor-liquid interface. The placement of the detector 31 radially has no ambiguous effect on the position estimate. Combining the time of flight and the triangulation information, however, will lead to an unambiguous distance solution.

It is desired to find the distance, d from information of the detector 31 position (specifically, its radial separation distance from the laser transmitter 35), x and total time of flight, TOF, of the laser beam 51. Equation (3) is based on equation (2) and outlines measured the time of flight of the laser beam in terms of the geometry outlined in FIG. 6. Equation (4) depicts the purely geometrical properties of the laser reflection scheme from pythagorean's theorem. Since the quantities: c, TOF, and x are known, equations (3) and (4) are solved simultaneously to determine the distance, d; where c= $3\times10^8$.

$$(d+h) = (c)(TOF) \tag{3}$$

$$d^2 + x^2 = h^2 \tag{4}$$

from equation (3):

$$h = (c)(TOF) - d \tag{5}$$

Substituting equation (5) into equation (4) and solving for d, yields:

$$d = [(c*TOF) - x^2]/(2*c*TOF) \tag{6}$$

Thus, a method has been outlined to determine the distance, d from the hull of a supercavitational high speed vehicle during underwater flight based on a combination of laser time-of flight and geometrical triangulation. In general terms, this invention outlines a technique for measuring the distance from the laser source to a dynamic surface whose reflective properties fluctuate in time. Although specific array designs and dimensions are mentioned, the invention is not limited to the specifications of position range estimates, such as the 10 mm to 100 mm range in detectable positions. These numbers are used merely as a guide to provide an estimate on the device in one particular application.

In an alternate embodiment of the present invention, the vapor-liquid boundary may be interrogated with any optical beam rather than laser radiation. Depending upon the focusing of the optical radiation onto the boundary, spatial resolution of the cavity wall contours may not be as high as with the laser interrogation method. The focal spot size of the laser interrogation beam may be as small as tens of micrometers.

The invention would accommodate measurements of the distance to any reflective surface, not limited to the vapor-liquid boundary, in motion or stationary.

The proposed laser-based apparatus for monitoring the cavity boundary is used to perform non-contact probing of the cavity vapor-liquid surface. Thus, determining the position of the vapor-liquid interface relative to the vehicle hull along the length of the vehicle does not affect the cavity wall structure and therefore does not affect vehicle drag.

It is apparent that there has been provided in accordance with the present invention a laser-based method for underwater supercavitational vehicle cavity wall measurement which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method of measuring the vapor-liquid boundary surrounding a supercavitational high speed underwater vehicle comprising the steps of:
    arranging a sensor on a surface of the vehicle, said sensor comprising a transmit source for emitting an optical signal, and a plurality of optical detectors for receiving a reflected optical signal;
    emitting an optical signal from said sensor at said transmit source;
    detecting a reflection of said emitted optical signal with at least one of said plurality of optical detectors of the sensor;
    measuring a duration of time between said emitting of said optical signal and said detecting of said reflection;
    computing a separation distance from said transmit source to at least one of said plurality of optical detectors having detected said reflection; and
    combining said duration of time and said separation distance to compute a boundary distance.

2. The method of claim 1 wherein said emitted optical signal is an interrogation pulse and said step of detecting detects a reflection of the interrogation pulse.

3. The method of claim 1 wherein a plurality of said sensors is arranged on said surface.

4. The method of claim 3 wherein each of said plurality of optical detectors further comprises:
    an operative lens positioned on said sensor to receive said reflection;
    a fiber optic lead having two ends, a first end being joined to each operative lens; and
    a photodetector device joined to a second end of said fiber optic lead to detect said reflection transmitted by said fiber optic lead.

5. The method of claim 1 wherein said optical signal is a signal selected from the group consisting of laser light, coherent radiation, focused light beams, and broadband white light.

6. The method of claim 1 wherein said transmit source and said plurality of optical detectors are arranged in a plane.

7. The method of claim 6 wherein said optical signal is emitted in a direction normal to said plane.

8. The method of claim 1 wherein said plurality of optical detectors are arranged in circumference about said transmit source.

9. The method of claim 1 wherein said step of combining is performed utilizing the following equation:

$$d=[(c*TOF)x^2]/(2*c*TOF)$$

wherein:
    d is the boundary distance;
    c is the speed of light in the vapor;
    x is the computed separation distance; and
    TOF is the measured duration of time.

10. An apparatus for measuring the distance to a reflective boundary from a vehicle comprising:
    at least one sensor arranged on a surface of the vehicle, said sensor comprising:
    a transmit source to emit an optical signal; and
    a plurality of optical detectors positioned to detect a reflection of said optical signal;
    a timer joined to said optical detectors to measure a duration of time between said emitting of said optical signal and said detection of said reflection;
    a computer joined to said timer and said optical detectors to compute a separation distance from said transmit source to one of said plurality of optical detectors having detected said reflection, said computer then receiving said duration of time from said timer and utilizing said duration of time and said separation distance to compute a boundary distance.

11. The apparatus of claim 10 wherein said optical signal is one signal selected from the group consisting of laser light, coherent radiation, focused light beams, and broadband white light.

12. The apparatus of claim 10 wherein said transmit source comprises a laser joined to a fiber optic lead.

13. The apparatus of claim 10 wherein each of said plurality of optical detectors further comprises:
    an operative lens positioned on said sensor to receive said reflection; and
    a fiber optic lead having two ends, a first end being joined to said operative lens; and
    a photodetector joined to a second end of said fiber optic lead to detect said reflection transmitted by said fiber optic lead.

14. The apparatus of claim 10 wherein said transmit source and said plurality of optical detectors are arranged in a plane.

15. The apparatus of claim 14 wherein said optical signal is emitted in a direction normal to said plane.

16. The apparatus of claim 10 wherein said plurality of optical detectors are arranged in circumference about said transmit source.

17. The apparatus of claim 10 wherein said computer computes said boundary distance utilizing the following equation:

$$d=[(c*TOF)-x^2]/(2*c*TOF)$$

wherein:
    d is the boundary distance;
    c is the speed of light in the vapor;
    x is the computed separation distance; and
    TOF is the measured duration of time.

* * * * *